(12) United States Patent
Lauter et al.

(10) Patent No.: US 11,196,539 B2
(45) Date of Patent: Dec. 7, 2021

(54) MULTIPLICATION OPERATIONS ON HOMOMORPHIC ENCRYPTED DATA

(71) Applicant: Microsoft Technology Licensing, LLC, Redmond, WA (US)

(72) Inventors: Kristin Estella Lauter, Redmond, WA (US); Hao Chen, Seattle, WA (US); Kim Henry Martin Laine, Seattle, WA (US); Gizem Selcan Cetin, Worcester, MA (US); Yuhou Xia, Princeton, NJ (US)

(73) Assignee: Microsoft Technology Licensing, LLC, Redmond, WA (US)

(*) Notice: Subject to any disclaimer, the term of this patent is extended or adjusted under 35 U.S.C. 154(b) by 51 days.

(21) Appl. No.: 15/630,824

(22) Filed: Jun. 22, 2017

(65) Prior Publication Data

US 2018/0375639 A1 Dec. 27, 2018

(51) Int. Cl.
  *H04L 29/06* (2006.01)
  *H04L 9/00* (2006.01)
  *H04L 9/08* (2006.01)

(52) U.S. Cl.
  CPC .............. *H04L 9/008* (2013.01); *H04L 9/088* (2013.01)

(58) Field of Classification Search
  CPC ................................ H04L 9/088; H04L 9/008
  See application file for complete search history.

(56) References Cited

U.S. PATENT DOCUMENTS

| | | | |
|---|---|---|---|
| 6,772,339 B1 | 8/2004 | Jakobsson et al. | |
| 8,429,421 B2 | 4/2013 | Chase et al. | |
| 8,515,058 B1 | 8/2013 | Gentry | |
| 8,903,083 B2 | 12/2014 | Gentry et al. | |
| 9,202,079 B2 | 12/2015 | Kaliski, Jr. | |
| 9,436,835 B1 * | 9/2016 | Saldamli | G06F 21/602 |
| 10,075,288 B1 | 9/2018 | Khedr et al. | |
| 10,116,437 B1 | 10/2018 | Krendelev | |

(Continued)

FOREIGN PATENT DOCUMENTS

EP 2924911 A1 9/2015

OTHER PUBLICATIONS

Beck,"Approximate Two-Party Privacy-Preserving String Matching with Linear Complexity", In Proceedings of IEEE International Congress on Big Data, BigData Congress, Jun. 27, 2013, 14 pages.

(Continued)

*Primary Examiner* — William J. Goodchild
*Assistant Examiner* — Rodman Alexander Mahmoudi
(74) *Attorney, Agent, or Firm* — Alleman Hall Creasman & Tuttle LLP (57) ABSTRACT

In aspects of multiplication operations on homomorphic encrypted data, a computing device stores homomorphic encrypted data as a dataset, and implements an encryption application that can perform multiplication operations on ciphertexts in the homomorphic encrypted data, where the ciphertexts include polynomial variables of the ciphertexts. The encryption application can compute and store intermediate polynomial variables that are computed as the multiplication operations are performed. The encryption application can then utilize one or more of the intermediate polynomial variables rather than recomputing the intermediate polynomial variables as the multiplication operations are performed on the ciphertexts.

17 Claims, 5 Drawing Sheets

(56) References Cited

U.S. PATENT DOCUMENTS

| | | |
|---|---|---|
| 2002/0027986 A1 | 3/2002 | Brekne |
| 2004/0078414 A1 | 4/2004 | Geiringer et al. |
| 2007/0116283 A1 | 5/2007 | Tuyls et al. |
| 2008/0294909 A1 | 11/2008 | Ostrovsky et al. |
| 2009/0327748 A1 | 12/2009 | Agrawal et al. |
| 2010/0020965 A1 | 1/2010 | Gueron et al. |
| 2011/0110525 A1* | 5/2011 | Gentry .................. H04L 9/0822 380/285 |
| 2012/0039463 A1 | 2/2012 | Gentry et al. |
| 2012/0039473 A1 | 2/2012 | Gentry et al. |
| 2013/0014270 A1 | 1/2013 | Sy et al. |
| 2013/0024653 A1 | 1/2013 | Gove |
| 2013/0170640 A1 | 7/2013 | Gentry |
| 2013/0216044 A1 | 8/2013 | Gentry et al. |
| 2013/0329883 A1 | 12/2013 | Tamayo-rios |
| 2014/0177828 A1 | 6/2014 | Loftus et al. |
| 2014/0215222 A1* | 7/2014 | Sakumoto ............. H04L 9/3252 713/176 |
| 2014/0233727 A1 | 8/2014 | Rohloff et al. |
| 2014/0325230 A1 | 10/2014 | Sy et al. |
| 2015/0033018 A1 | 1/2015 | Tateishi et al. |
| 2015/0039912 A1 | 2/2015 | Payton et al. |
| 2015/0046450 A1 | 2/2015 | Yoshino et al. |
| 2015/0046708 A1 | 2/2015 | Yasuda et al. |
| 2015/0280914 A1 | 10/2015 | Yasuda et al. |
| 2015/0288665 A1 | 10/2015 | El Emam et al. |
| 2015/0295716 A1 | 10/2015 | Liu |
| 2015/0312031 A1 | 10/2015 | Seo et al. |
| 2015/0318991 A1* | 11/2015 | Yasuda .................. H04L 9/008 380/28 |
| 2015/0358153 A1 | 12/2015 | Gentry |
| 2015/0365229 A1 | 12/2015 | Patey et al. |
| 2016/0105402 A1 | 4/2016 | Soon-shiong et al. |
| 2016/0119119 A1* | 4/2016 | Calapodescu ............. H04L 9/30 380/30 |
| 2016/0191233 A1 | 6/2016 | Loftus |
| 2017/0134157 A1* | 5/2017 | Laine ...................... H04L 9/008 |
| 2017/0134158 A1 | 5/2017 | Pasol et al. |
| 2017/0293913 A1* | 10/2017 | Gulak ................. G06Q 20/3829 |
| 2018/0011996 A1 | 1/2018 | Dolev et al. |
| 2018/0198601 A1 | 7/2018 | Laine et al. |
| 2018/0278410 A1 | 9/2018 | Hirano et al. |
| 2018/0375639 A1 | 12/2018 | Lauter et al. |
| 2018/0375640 A1 | 12/2018 | Laine et al. |
| 2019/0007197 A1 | 1/2019 | Laine et al. |
| 2019/0220734 A1* | 7/2019 | Ferdman ................. G06N 3/063 |
| 2020/0065480 A1* | 2/2020 | Gu .......................... G06F 21/64 |

OTHER PUBLICATIONS

Cetin, "Arithmetic Using Word-wise Homomorphic Encryption", https://eprint.iacr.org/2015/1195.pdf, Retrieved on: Oct. 21, 2016, 15 pages.

Lopez-Alt, "Cryptographic Algorithms for the Secure Delegation of Multiparty Computation", https://www.cs.nyu.edu/media/publications/AdrianaLopezalt.pdf, May 2014, 120 pages.

Stehlé, et al., "Faster Fully Homomorphic Encryption", In Proceedings of International Conference on the Theory and Application of Cryptology and Information Security, Dec. 5, 2010, 25 pages.

Ozturk, et al., "Accelerating Somewhat Homomorphic Evaluation using FPGAs", In Journal of IACR Cryptology ePrint Archive, Retrieved on: Oct. 18, 2016, 15 pages.

"Non-Final Office Action Issued in U.S. Appl. No. 15/630,761", dated: Mar. 22, 2019, 21 Pages.

"Final Rejection Issued In U.S. Appl. No. 15/633,284", dated: Apr. 25, 2019, 25 Pages.

"Non Final Office Action Issued in U.S. Appl. No. 15/633,284", dated: Dec. 26, 2018, 23 Pages.

"Non Final Office Action Issued in U.S. Appl. No. 15/638,181", dated: Dec. 27, 2018, 12 Pages.

Brakerski, et al., "Efficient Fully Homomorphic Encryption from (Standard) LWE", In the Proceedings Of 52nd Annual Symposium On Foundations of Computer Science, Oct. 22, 2011, pp. 97-106.

Chen, et al., "Fully Homomorphic Encryption Application In Cloud Computing", In The Proceedings of 11th International Computer Conference on Wavelet Active Media Technology and Information Processing, Dec. 19, 2014, pp. 471-474.

Wang, Yongge, "Octonion Algebra and Noise-Free Fully Homomorphic Encryption (FHE) Schemes", In the Journal of IACR Cryptology ePrint Archive, Jan. 25, 2016, 39 Pages.

Yong, et al., "A Novel Fully Homomorphic Encryption Scheme Bsed on LWE", In the Journal of Natural Sciences, Wuhan University, vol. 21, Issue 1, Feb. 1, 2016, pp. 84-92.

Zhang, et al., "Efficient Fully Homomorphic Encryption From RLWE with an Extension to a Threshold Encryption Scheme", In the Journal of Future Generation Computer Systems, vol. 36, Jul. 1, 2014, pp. 180-186.

Jaschke, et al., "Accelerating Homomorphic Computations on Rational Numbers", In Proceedings of International Conference on Applied Cryptography and Network Security, Jun. 19, 2016, 19 Pages.

Chase, et al., "Substring-Searchable Symmetric Encryption", In Proceedings on Privacy Enhancing Technologies, Jun. 18, 2015, 28 Pages.

Chen, et al., "Cocoon: Encrypted Substring Search", Retrieved From: https://pdfs.semanticscholar.org/ae2b/b2dd98ce5db50703005e3c6c7b43045621ca.pdf, May 11, 2016, 14 Pages.

Chen, et al., "Simple Encrypted Arithmetic Library—Seal v2.1", In Proceedings of International Conference on Financial Cryptography and Data Security, Nov. 19, 2017, 27 Pages.

Chung, et al., "Encoding Rational Numbers for FHE-based Applications", In Proceedings for International Association for Cryptologic Research, Mar. 30, 2016, 19 Pages.

Dowlin, et al., "Manual for Using Homomorphic Encryption for Bioinformatics", In Proceedings of the IEEE vol. 105, Issue 3, Mar. 2017, 18 Pages.

Fan, et al., "Somewhat Practical Fully Homomorphic Encryption", In Journal of IACR Cryptology ePrint Archive, Mar. 2012, 19 Pages.

Fouque, et al., "CryptoComputing with Rationals", In Proceedings of International Conference on Financial Cryptography, Mar. 11, 2002, 11 Pages.

Laine, Kim, "String Matching on Homomorphically Encrypted Data", Retrieved From: http://kimlaine.org/talks/IISc2017.pdf, Retrieved Date: Mar. 27, 2017, 28 Pages.

Lepoint, et al., "A Comparison of the Homomorphic Encryption Schemes FV and YASHE", In Proceedings of 7th International Conference on Cryptology in Africa, May 28, 2014, 18 Pages.

"International Search Report and Written Opinion Issued In PCT Application No. PCT/US2018/039571", dated Oct. 9, 2018, 13 Pages.

"International Search Report and Written Opinion Issued In PCT Application No. PCT/US2018/039634", dated Oct. 8, 2018, 13 Pages.

"Final Office Action Issued in U.S. Appl. No. 15/638,181", dated: Jun. 21, 2019, 24 Pages.

"Final Office Action Issued in U.S. Appl. No. 15/630,761", dated: Oct. 2, 2019, 20 Pages.

"Notice of Allowance Issued in U.S. Appl. No. 15/630,761", dated: Jun. 10, 2020, 17 Pages.

"Office Action Issued in European Patent Application No. 18743189.5", dated: Apr. 23, 2021, 7 Pages.

\* cited by examiner

MULTIPLICATION OPERATIONS ON HOMOMORPHIC ENCRYPTED DATA

BACKGROUND

Cloud-based storage and on-line services are readily available and continue to develop rapidly. Enterprise customers, such as in the medical and financial sectors, save money and streamline business processes by outsourcing the storage and computation of their data to public storage, such as provided by cloud-based services. Instead of storing and managing a large amount of data locally, a medical service provider, for example, can utilize cloud storage for electronic medical records of patient data, and a financial service provider can utilize the cloud storage for financial data and customer records. However, using public cloud-based storage can potentially expose data, compromising the privacy and security of the personal medical, financial, and other sensitive data.

One effective technique is to store private and sensitive data in an encrypted form in the public cloud-based storage, and perform computations on the encrypted data directly. However, typical block ciphers do not allow encrypted data to be used in encrypted form, and meaningful computation on the encrypted data would either require it to be returned to the owner of the data for decryption, or alternatively, for the cloud-based storage service to have access to the decryption key. Homomorphic encryption refers to encryption schemes used to encrypt data in a way that allows evaluating Boolean or arithmetic circuits on the encrypted data while it remains encrypted. Homomorphic encryption may also refer to encryption schemes with less capabilities, such as for performing only additions or only multiplications on the encrypted data. However, the conventional techniques used to evaluate homomorphic encrypted data are significantly less efficient than operating on unencrypted data, such as if the data is returned to the owner of the data for decryption.

SUMMARY

This Summary introduces features and concepts of multiplication operations on homomorphic encrypted data, which is further described below in the Detailed Description and/or shown in the Figures. This Summary should not be considered to describe essential features of the claimed subject matter, nor used to determine or limit the scope of the claimed subject matter.

Multiplication operations on homomorphic encrypted data is described. In aspects, a computing device stores homomorphic encrypted data as a dataset, and implements an encryption application that can perform multiplication operations on ciphertexts in the homomorphic encrypted data, where the ciphertexts include polynomial variables of the ciphertexts. The encryption application can compute and store intermediate polynomial variables that are computed as the multiplication operations are performed. The encryption application can determine the intermediate polynomial variables to utilize for the multiplication operations and initially compute the intermediate polynomial variables prior to use as the multiplication operations are performed on the ciphertexts. The encryption application can then utilize one or more of the intermediate polynomial variables rather than recomputing the intermediate polynomial variables as the multiplication operations are performed on the ciphertexts.

In other aspects of multiplication operations on homomorphic encrypted data, the encryption application is implemented to determine a minimal multiplicative depth for the multiplication operations performed on the ciphertexts, and minimize a number of consecutive multiplication operations performed on the polynomial variables of the ciphertexts. The encryption application can apply a Fourier transform to determine the intermediate polynomial variables of a ciphertext, multiply two transformed polynomials coefficient-wise, and apply an inverse Fourier transform to the multiplied transformed polynomials effective to transform back. The encryption application is also implemented to minimize a number of the multiplication operations to instead perform addition and subtraction operations for faster computations on the polynomial variables of the ciphertexts.

BRIEF DESCRIPTION OF THE DRAWINGS

Aspects of multiplication operations on homomorphic encrypted data are described with reference to the following Figures. The same numbers may be used throughout to reference like features and components that are shown in the Figures.

DETAILED DESCRIPTION

Aspects of multiplication operations on homomorphic encrypted data are described, such as to implement techniques for improved and faster processing of multiplication operations performed on ciphertexts in homomorphic encrypted data. Generally, homomorphic encryption can be used to encrypt data in a way that allows computations to be performed on the encrypted data without decrypting it, such as evaluating Boolean or arithmetic circuits on the encrypted data while it remains encrypted. Utilizing homomorphic encryption has applications in privacy-preserving data analysis. However, in homomorphic encrypted data, the ciphertexts include polynomial variables, and multiplication operations that compute products of the polynomial variables of the ciphertexts can be relatively slow when operating on the homomorphic encrypted data, as compared to operations that may be applied on unencrypted data.

The techniques for multiplication operations on homomorphic encrypted data can be implemented as optimizations to improve processing speed, such as when computing the products of polynomials for multiplication operations on the polynomial variables of ciphertexts in homomorphic encrypted data. In implementations, the optimizations can be applied to compute and store intermediate polynomial variables, reduce the number of multiplication operations on the polynomial variables of the ciphertexts, as well as maintain a minimal multiplicative depth for computing and processing performance. Further, when a homomorphically encrypted variable of a ciphertext is squared, the computing and processing performance is improved by not repeating Fourier Transforms of the polynomial components.

While features and concepts of multiplication operations on homomorphic encrypted data can be implemented in any number of different devices, systems, networks, environments, and/or configurations, aspects of multiplication operations on homomorphic encrypted data are described in the context of the following example devices, systems, and methods.

Figure 1:
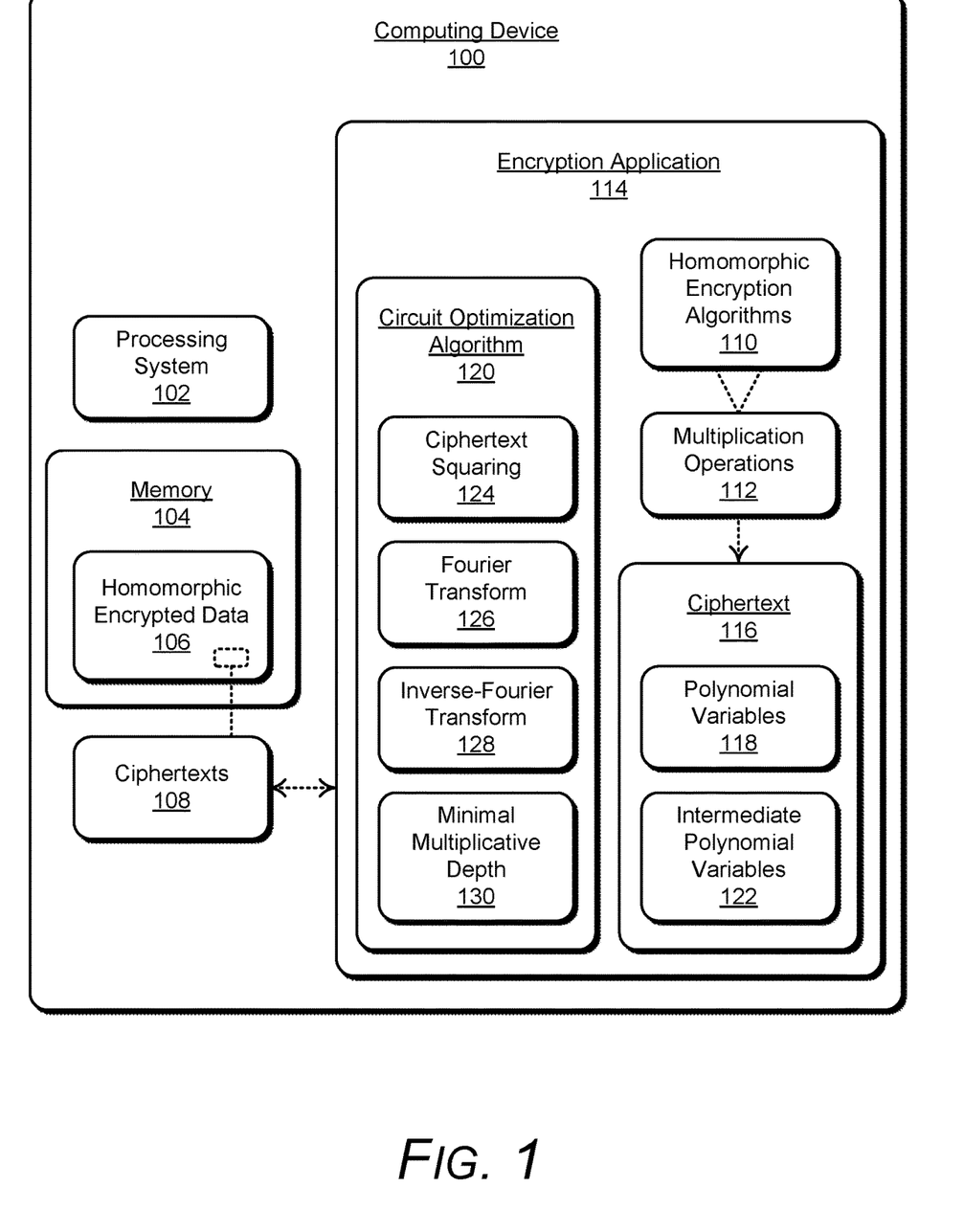
FIG. 1 illustrates an example computing device in which aspects of multiplication operations on homomorphic encrypted data can be implemented as described herein.

FIG. 1 illustrates an example computing device 100 in which aspects of multiplication operations on homomorphic encrypted data can be implemented. The computing device 100 can be implemented with various components, such as a processing system 102 and memory 104 (e.g., non-volatile, physical memory), and with any number and combination of different components as further described with reference to the example device shown in FIG. 5. In implementations, the processing system 102 may include multiple and/or different processors, such as a microprocessor, a separate graphics processor, and/or a separate high-speed, dedicated processor.

In this example, homomorphic encrypted data 106 is stored in the memory 104, such as a dataset of homomorphic encrypted data of ciphertexts 108. The homomorphic encrypted data 106 can include N (bit) strings of some length L, all of which are encrypted using homomorphic encryption to encrypt one bit of the data at a time. The encrypted bits in the dataset of homomorphic encrypted data 106 can be denoted as $R_{\{1,1\}}, \ldots R_{\{N,L\}}$, in rows and columns of the encrypted bits.

The techniques of multiplication operations on homomorphic encrypted data are described in the general context of evaluating the homomorphic encrypted data 106, and homomorphic encryption algorithms 110 are applied to evaluate the homomorphic encrypted data in the dataset while the data remains encrypted. The techniques described herein provide improved and faster processing of multiplication operations 112 performed on the ciphertexts 108 in the homomorphic encrypted data 106, such as by storing and using intermediate polynomial variables of the ciphertexts and by maintaining a minimal multiplicative depth of the ciphertexts for increased processing performance.

The computing device 100 implements the encryption application 114 that can include various algorithms to implement the techniques of multiplication operations on homomorphic encrypted data, as described herein. The application and algorithms can be implemented as software applications or modules, such as computer-executable software instructions that are executable with the processing system 102. The encryption application 114 can be stored in computer-readable storage memory (e.g., the memory 104), such as any suitable memory device or electronic data storage implemented in the computing device. Further, although the various algorithms are shown and described as modules of the encryption application 114, any one or combination of the algorithms may be implemented separately or together, and may be independent of the encryption application. An overview of the encryption application 114 and the various algorithms is described following, with additional implementation details described with reference to FIG. 2.

In aspects of multiplication operations on homomorphic encrypted data, the encryption application 114 can apply one or more of the various algorithms 110 to perform homomorphic operations, such as the multiplication operations 112, on the ciphertexts 108 of the homomorphic encrypted data 106. The multiplication operations 112 operate on polynomial variables of the ciphertexts 108, such as a ciphertext 116 that is formed with polynomial variables 118. The multiplication operations 112 compute several products of the polynomial variables 118 of the ciphertext 116, and the processing to compute the products of the polynomials can be relatively slow, particularly due to the operations on the encrypted homomorphic encrypted data 106, which can be significantly less efficient than operating on unencrypted data.

In this example, the encryption application 114 includes a circuit optimization algorithm 120 that is implemented to compute and store intermediate polynomial variables 122 of the ciphertext 116. The intermediate polynomial variables 122 can be computed as the multiplication operations 112 are performed and/or can be initially-computed and stored for use prior to the multiplication operations being performed on the ciphertext 116. The encryption application 114 can then utilize one or more of the intermediate polynomial variables 122 for the multiplication operations 112 rather than recomputing the intermediate polynomial variables as the multiplication operations are performed on the ciphertexts.

For example, the ciphertext 116 may be denoted as $F(x)=x^7+x^3$, having polynomials $x^7$ and $x^3$, where $F(x)$ denotes operation on a ciphertext. The number of polynomial multiplications can be reduced, such as by first computing $x^3$ once and computing $x^4$. A technique for ciphertext squaring 124 can be applied twice to generate $x^4$, which also generates $x^2$ as in intermediate polynomial variable 128 that can then be used to simply multiply by x and generate $x^3$. Additionally, the $x^4$ and $x^3$ variables can then be multiplied to compute $x^7$. The technique for ciphertext squaring 124 applies a Fourier transform 126 to determine the intermediate polynomial variables 122 of the ciphertext 116, and applies an inverse Fourier transform 128 to the intermediate polynomial variables after two transformed polynomials are multiplied. The polynomial variables $x^7$ and $x^3$ can then be added to compute the ciphertext $F(x)$.

In implementations, the polynomial multiplications in $R_t$ (e.g., the plaintext space is the polynomial quotient ring $R_t$) are performed efficiently by first applying the Fourier transform 126 to two polynomials, then multiplying the transformed polynomials coefficient-wise, and then transforming back with the inverse Fourier transform 128. Note that addition operations can be performed just as well in either a Fourier-transformed or normal domain, with both polynomial inputs being of a similar type. Generally, if one input is needed or can be used for several multiplications, the Fourier transform of the one input can be stored so that it doesn't need to be repeatedly transformed per every multiplication where it is used.

In other aspects of multiplication operations on homomorphic encrypted data, the circuit optimization algorithm 120 of the encryption application 114 is implemented to determine a minimal multiplicative depth 130 for the multiplication operations 112 performed on the ciphertext 116, and minimize a number of consecutive multiplication operations performed on the polynomial variables of the ciphertexts. For example, rather than computing $x^4$ by starting with x, computing $x^2$, then multiplying by x again twice to compute $x^4$, a minimal multiplicative depth computation would start with x, compute $x^2$, and then square $x^2$ to derive $x^4$. This involves only two multiplication steps, rather than the initial three multiplication steps. The circuit optimization algorithm 120 is implemented to determine not just polynomial optimizations on plaintext data, but rather multiplication operations on ciphertexts that involve polynomials as variables of each of the ciphertexts, and to then compute products of the polynomials within the ciphertexts of the homomorphic encrypted data.

In optimizations described below, the circuit optimization algorithm 120 of the encryption application 114 can apply the Fourier transform 126 to determine the intermediate polynomial variables 122 of the ciphertext 116, multiply two transformed polynomials coefficient-wise, and apply the inverse Fourier transform 128 to the multiplied transformed polynomials effective to transform back. The circuit optimization algorithm 120 is also implemented to minimize a number of the multiplication operations 112 to instead perform addition and subtraction operations, which are faster computations on the polynomial variables 118 of the ciphertexts that the multiplication operations 112.

Ciphertext Multiplication Operations

With reference to the techniques for multiplication operations implemented by the encryption application 114 for ciphertext multiplication operations, arbitrary size ciphertexts can be represented as:

$$c = \langle c_0, c_1, \ldots, c_k \rangle \quad c(z) = c_0 + c_1 z + \ldots + c_k z^k$$

$$d = \langle d_0, d_1, \ldots, d_l \rangle \quad d(z) = d_0 + d_1 z + \ldots + d_l z^l$$

for all $c_i, d_i \in Z_q/f(x)$. The newly encrypted (or "freshly" encrypted) ciphertexts have two components at first. The following notation for the different multiplication types is used herein: $c \circledast d$ is a ciphertext multiplication, $c_i * d_j$ and $c *_z d$ are polynomial multiplications, $\odot$ is a coefficient-wise product, and · is integer multiplication. The ciphertext multiplication in FV-like homomorphic schemes can be defined as follows:

$$c \circledast d = c *_z d$$

$$= (c_0 + c_1 z + \ldots + c_k z^k) * z(d_0 + d_1 z + \ldots + d_l z^l)$$

$$= (c_0 * d_0) + (c_0 * d_1 + c_1 * d_0)z + \ldots + (c_k * d_l)z^{k+l}$$

$$= \langle c_0 * d_0, c_0 * d_1 + c_1 * d_0, \ldots, c_k * d_l \rangle$$

followed by a scaling operation and reducing the results in $Z_q/f(x)$. The schoolbook implementation of this ciphertext multiplication requires k·l polynomial multiplications and it is the bottleneck of ciphertext multiplication, as the following (scaling and modulo reduction) operations are less significant in terms of performance compared to a polynomial multiplication. The Karatsuba technique can be implemented to reduce the number of polynomial multiplications in a ciphertext multiplication.

In the Karatsuba algorithm for ciphertexts of size two (2), $c = \langle c_0, c_1 \rangle$, $d = \langle d_0, d_1 \rangle$, and $h = c \circledast d$, needing to compute $h_0 = c_0 * d_0$, $h_1 = c_0 * d_1 + c_1 * d_0$, and $h_2 = c_1 * d_1$, which requires four (4) multiplication operations. By using the Karatsuba algorithm, the number of multiplication operations can be reduced to three (3), such as by computing $h_0 = c_0 * d_0$, $h_2 = c_1 * d_1$, and $h_1 = (c_0 + c_1) * (d_0 + d_1) - h_0 - h_2$.

For larger ciphertexts, the Karatsuba algorithm can be applied recursively. For example, in the Karatsuba algorithm for ciphertexts of size four (4), $c = \langle c_0, c_1, c_2, c_3 \rangle$, $d = \langle d_0, d_1, d_2, d_3 \rangle$, and $h = c \circledast d$. The c and d are separated into two parts as: $\tilde{c}_0 = \langle c_0, c_1 \rangle$ and $\tilde{c}_1 = \langle c_2, c_3 \rangle$, similarly $\tilde{d}_0 = \langle d_0, d_1 \rangle$ and $\tilde{d}_1 = \langle d_2, d_3 \rangle$. Then compute:

$$h_0 = \tilde{c}_0 \circledast \tilde{d}_0$$
$$= \left( \underbrace{c_0 * d_0}_{h_{00}}, \underbrace{c_0 * d_1 + c_1 * d_0}_{h_{01}}, \underbrace{c_1 * d_1}_{h_{02}} \right)$$

$$h_2 = \tilde{c}_1 \circledast \tilde{d}_1$$
$$= \left( \underbrace{c_2 * d_2}_{h_{20}}, \underbrace{c_2 * d_3 + c_3 * d_2}_{h_{21}}, \underbrace{c_3 * d_3}_{h_{22}} \right)$$

$$h_1 = (\tilde{c}_0 + \tilde{c}_1) \circledast (\tilde{d}_0 + \tilde{d}_1) - h_0 - h_2$$
$$= \langle c_0 + c_2, c_1 + c_3 \rangle \circledast \langle d_0 + d_2, d_1 + d_3 \rangle - h_0 - h_2$$
$$= \langle (c_0 + c_2) * (d_0 + d_2), (c_0 + c_2) * (d_1 + d_3) + (c_1 + c_3) * (d_0 + d_2), (c_1 + c_3) * (d_1 + d_3) \rangle -$$
$$\langle h_{00}, h_{01}, h_{02} \rangle - \langle h_{20}, h_{21}, h_{22} \rangle$$
$$= \langle \underbrace{(c_0 * d_2 + c_2 * d_0)}_{h_{10}}, \underbrace{(c_0 * d_3 + c_1 * d_2 + c_2 * d_1 + c_3 * d_0)}_{h_{11}},$$
$$\underbrace{(c_1 * d_3 + c_3 * d_1)}_{h_{12}} \rangle$$

and the result will be:

$$h = \langle h_{00}, h_{01}, (h_{02} + h_{10}), h_{11}, (h_{12} + h_{20}), h_{21}, h_{22} \rangle$$

with only having to compute three (3) multiplication operations. Given that the base case is already defined, compute each $\tilde{c}_i \circledast \tilde{d}_j$ using three polynomial multiplications, which means performing nine (9) polynomial multiplication operations in total, rather than sixteen (16) as with the conventional technique. The same Karatsuba algorithm technique can be applied to power of 2-length ciphertexts recursively by separating the ciphertext into two halves and applying Karatsuba multiplication for each part.

In the Karatsuba algorithm for ciphertexts of size three (3), $c = \langle c_0, c_1, c_2 \rangle$, $d = \langle d_0, d_1, d_2 \rangle$, and $h = c \circledast d$. The c and d are separated into two parts as: $\tilde{c}_0 = \langle c_0, c_1 \rangle$ and $\tilde{c}_1 = \langle c_2 \rangle$, similarly $\tilde{d}_0 = \langle d_0, d_1 \rangle$ and $\tilde{d}_1 = \langle d_2 \rangle$. Then compute:

$$h_0 = \tilde{c}_0 \circledast \tilde{d}_0$$
$$= \langle \underbrace{c_0 * d_0}_{h_{00}}, \underbrace{c_0 * d_1 + c_1 * d_0}_{h_{01}}, \underbrace{c_1 * d_1}_{h_{02}} \rangle$$

$$h_2 = \underbrace{\langle c_2 * d_2 \rangle}_{h_{20}}$$

$$h_1 = \langle (c_0 + c_2) * (d_0 + d_2), (c_1 + c_2) * (d_1 + d_2) \rangle -$$
$$\langle h_{00}, h_{02} \rangle - \langle h_{20}, h_{20} \rangle$$
$$= \langle \underbrace{(c_0 * d_2 + c_2 * d_0)}_{h_{10}}, \underbrace{(c_1 * d_2 + c_2 * d_1)}_{h_{11}} \rangle$$

and the result will be:

$$h = \langle h_{00}, h_{01}, (h_{02} + h_{10}), h_{11}, h_{20} \rangle$$

with only having to compute three (1) $\circledast$ operation which has three (3) polynomial multiplications, another polynomial multiplication for $h_2$, and then two (2) polynomial multiplications for $h_1$, which means performing six (6) polynomial multiplication operations in total, rather than nine (9) as with the conventional technique.

In the case of squaring a ciphertext, a ciphertext $c = \langle c_0, c_1 \rangle$ and compute $h = c \circledast d$, where $h_0 = c_0 * c_0$, $h_1 = c_0 * c_1 + c_1 * c_0$, and $h_2 = c_1 * c_1$, following the conventional technique. However, implementing the square operation is more efficient using $h_0 = c_0^2$, $h_1 = 2(c_0 * c_1)$, and $h_2 = c_1^2$ is more efficient even than using Karatsuba multiplication because there are less additions and scalar multiplication in $h_1$ can be implemented using a left shift operation.

Figure 2:
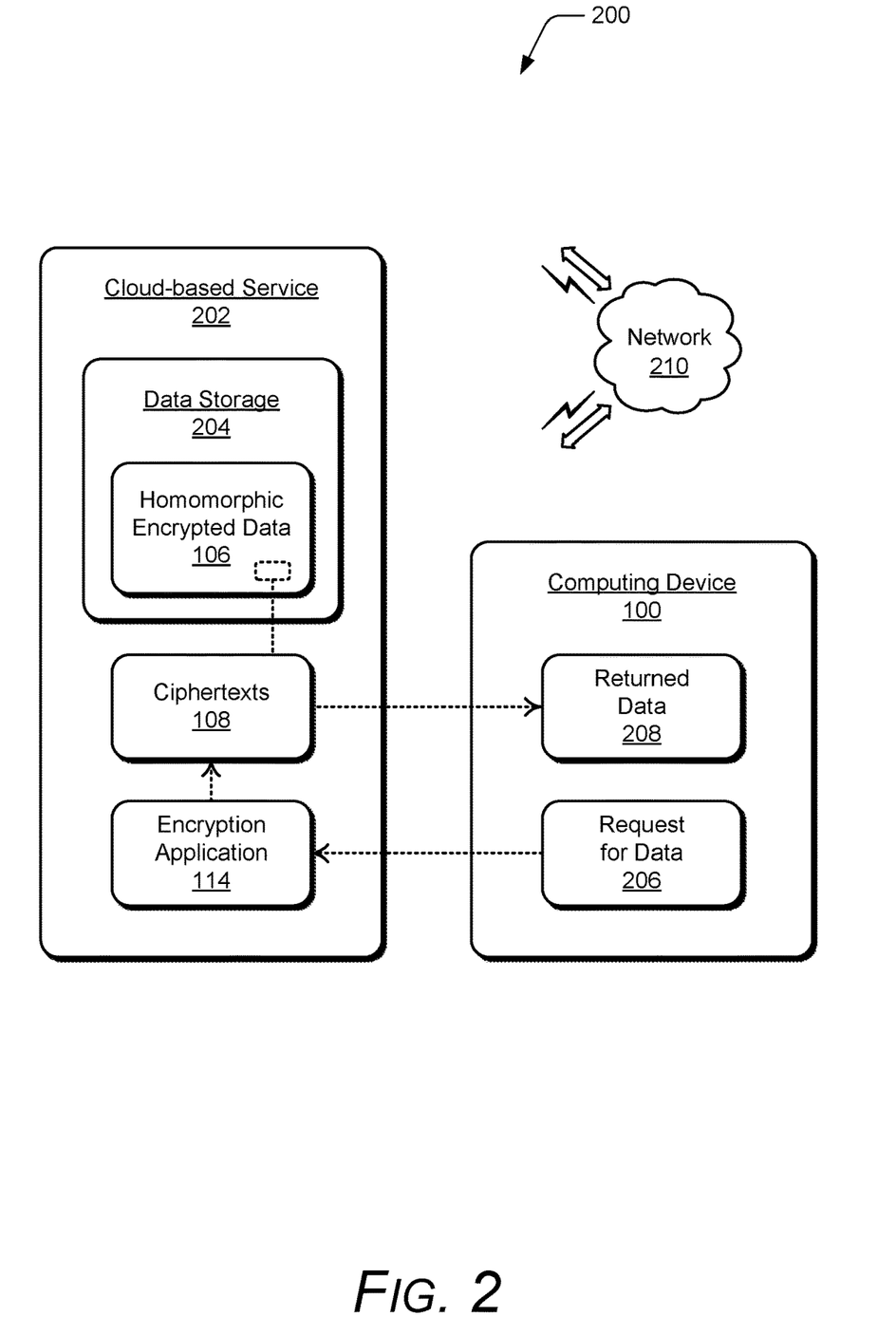
FIG. 2 illustrates an example system in which aspects of multiplication operations on homomorphic encrypted data can be implemented as described herein.

FIG. 2 illustrates an example system 200 in which aspects of multiplication operations on homomorphic encrypted data can be implemented as described herein. The example system 200 includes the computing device 100 that is shown and described with reference to FIG. 1. The example system also includes a cloud-based service 202 that is accessible by computing devices, to include the computing device 100. The cloud-based service 202 includes data storage 204 that may be implemented as any suitable memory, memory device, or electronic data storage for network-based storage.

The data storage 204 can store the homomorphic encrypted data 106. The cloud-based service 202 can also implement an instance of the encryption application 114, as shown and described with reference to FIG. 1.

In this instance, the encryption application 114 can receive a request for data 206 from the computing device 100, such as a request to access the encrypted data or a query of the homomorphic encrypted data 106 in the dataset. The encryption application 114 can then apply one or more of the various homomorphic encryption algorithms 110 shown and described with reference to FIG. 1, performing the multiplication operations 112. The encryption application 114 can also apply the described efficiencies and techniques of multiplication operations on homomorphic encrypted data, as described herein. The encryption application 114 can process and determine the requested data 206 from the homomorphic encrypted data 106, and the requested data can then be returned to the computing device 100 as the returned data 208.

The cloud-based service 202 can also be implemented with server devices that are representative of one or multiple hardware server devices of the service. Further, the cloud-based service 202 can be implemented with various components, such as a processing system and memory, as well as with any number and combination of different components as further described with reference to the example device shown in FIG. 5 to implement the services, applications, servers, and other features of multiplication operations on homomorphic encrypted data. Other aspects of multiplication operations on homomorphic encrypted data as described herein can be implemented by the encryption application 114 at the cloud-base service and/or may be implemented in conjunction with the encryption application 114 that is implemented by the computing device 100, as shown and described with reference to FIG. 1.

The example system 200 also includes a network 210, and any of the devices, servers, and/or services described herein can communicate via the network, such as for data communication between the computing device 100 and the cloud-based service 202. The network 210 can be implemented to include a wired and/or a wireless network. The network can also be implemented using any type of network topology and/or communication protocol, and can be represented or otherwise implemented as a combination of two or more networks, to include IP-based networks and/or the Internet. The network may also include mobile operator networks that are managed by a mobile network operator and/or other network operators, such as a communication service provider, mobile phone provider, and/or Internet service provider.

Homomorphic Encryption

Homomorphic encryption is a powerful cryptographic technique that allows computation on encrypted data without first decrypting it. Even though anyone can operate on the encrypted data, the results of the operations remain encrypted, and no information about the underlying plaintext is leaked, except perhaps its size. In examples, a medical service provider may want to outsource the storage of encrypted medical data files for public cloud-based storage, such as at the cloud-based service 202 with the data storage 204. Similarly, a financial service provider may want to outsource the storage of encrypted financial data files for public cloud-based storage.

In order to protect the privacy of the patients of the medical service provider, and protect the privacy of the customers of the financial service provider, the respective medical data files and the financial data files are uploaded to the cloud-based service 202 for storage in encrypted form, such as the homomorphic encrypted data 106 in a dataset. At a later date, the medical service provider or the financial service provider may want to request and/or update the encrypted data that has been uploaded to the cloud-based storage. The computing device 100 is representative of an entity accessing or initiating a request for the homomorphic encrypted data 106 that has been stored as a dataset in the data storage 204 at the cloud-based service 202. A data request or data update can be communicated from the medical service provider or the financial service provider in an encrypted form to protect the privacy of the respective patients and customers.

Generally, the techniques and algorithms of multiplication operations on homomorphic encrypted data as described herein are agnostic to the encryption scheme that is being used for homomorphic encryption. However for simplicity, the discussion centers on Ring-LWE (learning with error)-based cryptosystems using power-of-2 cyclotomic rings of integers. This is described in a document "On ideal lattices and learning with errors over rings" by Lyubashevsky et al. (Advances in Cryptology—EUROCRYPT 2010, $29^{th}$ Annual International Conference on the Theory and Applications of Cryptographic Techniques, French Riviera, May 30-Jun. 3, 2010. Proceedings, volume 6110 of Lecture Notes in Computer Science, pages 1-23. Springer, 2010). In such cryptosystems, the plaintext space is typically the polynomial quotient ring $Z_t[x]/(x^n+1)$, and the ciphertext space is the polynomial quotient ring $Z_q[x]/(x^n+1)$, where n is a power of 2, and $t \ll q$ are integers. Here $Z_t$ and $Z_q$ denote integers modulo t and q, respectively. Thus, it is customary to denote $R=Z[x]/(x^n+1)$, so that the plaintext and ciphertext spaces become $R_t=R/tR$, and $R_q=R/qR$, respectively. In implementations, the techniques described herein can utilize the Simple Encrypted Arithmetic Library (SEAL version of the library v2.1), which implements the Fan-Vercauteren scheme. Thus, the techniques also may apply trivially to many other encryption schemes that are used for homomorphic encryption.

As a distinction, fully homomorphic encryption refers to an encryption scheme which can evaluate any arithmetic circuit on encrypted inputs, but in practice, is extensive to implement. Rather, by restricting the multiplicative depth of the circuits to some bound L, the parameters of the encryption scheme can be set to support only circuits up to depth L, and significantly better performance is obtained with this "leveled fully" homomorphic encryption scheme, rather than the result of using a true fully homomorphic encryption scheme. The leveled fully homomorphic encryption scheme can be described by randomized algorithms, which include Setup, KeyGen, Encrypt, Decrypt, and Evaluate algorithms.

Given a security parameter K and a parameter $L \in Z^+$ (level), the Setup($1^K$, $1^L$) outputs a set of encryption parameters parms. The KeyGen(parms) outputs a secret key sk and a public key pk, and optionally, outputs one or more evaluation keys evk. Given a message $m \in R_t$, the Encrypt(m, pk) outputs ciphertext $c \in R_q$. Given the ciphertext $c \in R_q$, the Decrypt(c, sk) outputs a message $m \in R_t$. For the Evaluate(C, (c1, ..., $c_k$), evk): Given a circuit f of depth at most L with k input wires, and inputs c1, ..., $c_k$, with $c_i \rightarrow$ Encrypt($m_i$, pk), outputs a ciphertext c such that Pr [Decrypt(c, sk)$\neq$ f($m_1$, ..., $m_k$)]=negl($\kappa$). Additionally, the size of the output of Evaluate is not more than a polynomial in $\kappa$ independent of f (compactness), and independent of L. The leveled fully homomorphic encryption scheme is secure if it is IND-CPA secure.

With reference to encoding, the techniques described herein restrict to encryption schemes for homomorphic encryption where the plaintext space is the polynomial quotient ring $R_t$. Thus, when integers are to be encrypted, and integer arithmetic performed on them in encrypted form, an encoding scheme is used to convert integers into elements of $R_t$. There are many ways to do this, however the simplest and easiest method can be utilized for multiplication operations on homomorphic encrypted data. Given an integer $m \in Z$, it is encoded as the constant polynomial $m \in R_t$, allowing for only encoding integers between zero (0) and t-1, which provides a strict lower bound on the size of t that can be used. Because $Z_t$ is a subring of $R_t$, as long as the coefficients of the underlying plaintext polynomials that are encountered during the homomorphic evaluation never get reduced modulo t, the homomorphic encryption scheme can be used to perform integer arithmetic. This can place a strong lower bound on the size of t, which subsequently necessitates the use of larger n and q, meaning that t should be chosen to be as small as possible.

With reference to batching, this technique allows SIMD (Single Instruction, Multiple Data) operations to be performed on homomorphically encrypted data. The batching technique allows for a method of packing several plaintext integers into one plaintext polynomial in a way that allows sums and products to be evaluated on the individual integers in encrypted form, all at the cost of only one homomorphic operation. Generally, a homomorphic encoding scheme can be extremely wasteful, as it encodes only one single integer modulo t into a plaintext polynomial with enough space to store thousands of such integers. As noted above, ring $R=Z[x]/(x^n+1)$ is used to construct both the plaintext space ($R_t$) and the ciphertext space ($R_q$), and n is always a power of two (2). A naive way to improve is by enabling SIMD operations to encode one integer modulo t into each coefficient of the message polynomial. While such an encoding would work when the additive homomorphism is used (the addition of polynomials in $R_t$ is done coefficient-wise), it would not work for multiplications.

Instead, the standard approach is to choose t such that the polynomial modulus $x^n+1$ factors into n linear factors modulo t. This is achieved by restricting t to be a prime such that $2n|(t-1)$. This results in the plaintext space $R_t$ to split into a direct product as $R_t \cong Z_t^n$, where the isomorphism is an isomorphism of rings, meaning it respects both additions and multiplications. Given a vector $m \in Z_t^n$ representing the values in the individual slots, its composition is denoted into a plaintext polynomial $m \in R_t$ by Compose(m). Similarly, given a plaintext polynomial $m \in R_t$, its decomposition is denoted into a vector $m \in Z_t^n$ representing the values in the individual slots by Decompose(m). In computations where SIMD operations can be used, batching can provide a significant improvement in latency, and in other cases at least in throughput.

FV Scheme and Encoding

With reference to plaintext space and encodings in the Fan-Vercauteren (FV) scheme, the plaintext space is $R_t=Z_t[x]/(x^n+1)$ as polynomials of degree less than n with coefficients modulo t. The ring structure in $R_t$ is used so that a product of two plaintext polynomials becomes the product of the polynomials with $x^n$ being converted everywhere to a $-1$. The homomorphic addition and multiplication operations on ciphertexts will carry through the encryption to addition and multiplication operations in $R_t$. For example, to encrypt an integer or a rational number, it is first encoded into a plaintext polynomial in $R_t$, and can be encrypted only after that. To also be able to compute addition and multiplication operations on the integers in encrypted form, the encoding is such that the addition and multiplication of encoded polynomials in $R_t$ carry over correctly to the integers when the result is decoded.

Table1 below indicates notations used herein:

TABLE 1

Notations

| Parameter | Description |
| --- | --- |
| q | Modulus in the ciphertext space (coefficient modulus) |
| t | Modulus in the plaintext space (plaintext modulus) |
| n | A power of 2 |
| $x^n+1$ | The polynomial modulus which specifies the ring R |

TABLE 1-continued

Notations

| Parameter | Description |
| --- | --- |
| R | The ring $Z[x]/(x^n+1)$ |
| $R_a$ | The ring $Z_a[x]/(x^n+1)$, same as the ring R but with coefficients reduced modulo a |
| w | A base into which ciphertext elements are decomposed during relinearization |
| log w | The decomposition bit count, and log means log2 |
| l | There are $l+1 = \lfloor \log_w q \rfloor + 1$ elements in each component of each evaluation key |
| δ | Expansion factor in the ring R(δ ≤ n) |
| Δ | Quotient on division of q by t, or $\lfloor q/t \rfloor$ |
| $r_t(q)$ | Remainder on division of q by t (i.e., $q = \Delta t + r_t(q)$, where $0 \leq r_t(q) < t$ |
| χ | Error distribution (a truncated discrete Gaussian distribution) |
| σ | Standard deviation of χ |
| B | Bound on the distribution χ |

In the ciphertext space, the ciphertexts in the FV scheme are arrays of polynomials in $R_q$. These arrays can contain at least two polynomials, but grow in size in homomorphic multiplication operations unless relinearization is performed. Homomorphic additions are performed by computing a component-wise sum of these arrays, but multiplications are more complicated.

In implementations, λ is the security parameter, w is a base, and $l+1=\lfloor \log_w q \rfloor +1$ denotes the number of terms in the decomposition into base w of an integer in base q. The polynomials in $R_q$ are decomposed into base-w components coefficient-wise, resulting in l+1 polynomials. The notation $$a \xleftarrow{\$} S$$

denotes that a is sampled uniformly from the finite set S. The FV scheme includes the algorithms SecretKeyGen, PublicKeyGen, EvaluationKeyGen, Encrypt, Decrypt, Add, and Multiply, as described below:

SecretKeyGen(λ): Sample $$s \xleftarrow{\$} R_2$$

and output sk=s.

PublicKeyGen(sk): Set s=sk, sample $$a \xleftarrow{\$} R_q,$$

and e←χ.
Output pk=$([-(as+e)]_q, a)$.
EvaluationKeyGen(sk, w): for $i \in \{0, \ldots, l\}$, sample $$a_i \xleftarrow{\$} R_q,$$

e←χ.
Output evk=$([-(a_i s+e_i)+w^i s^2]_q, a_i)$.
Encrypt(pk, m): for $m \in R_t$, let pk=$(p_0, p_1)$, sample $$u \xleftarrow{\$} R_2,$$

& $e_1, e_2 \leftarrow \chi$.
Compute ct=$([\Delta m+p_0 u+e_1]_q, [p_1 u+e_2]_q)$.
Decrypt(sk, ct): set s=sk, $c_0$=ct[0], and $c_1$=ct[1].

$$\text{Output} \left[ \left\lfloor \frac{t}{q} [c_0 + c_1 s]_q \right\rceil \right]_t.$$

Add($ct_0$, $ct_1$): output ($ct_0[0]+ct_1[0]$, $ct_0[1]+ct_1[1]$).

Multiply($ct_0$, $ct_1$): Compute $$c_0 = \left[\left\lfloor \frac{t}{q} ct_0[0]ct_1[0] \right\rceil\right]_q$$

$$c_1 = \left[\left\lfloor \frac{t}{q} (ct_0[0]ct_1[1] + ct_0[1]ct_1[0]) \right\rceil\right]_q$$

$$c_2 = \left[\left\lfloor \frac{t}{q} ct_0[1]ct_1[1] \right\rceil\right]_q$$

Express $c_2$ in base w as $c_2 = \sum_{i=1}^{\ell} c_2^{(i)} w^i$ and set $$c_0' = c_0 + \sum_{i=0}^{\ell} evk[i][0] c_2^{(i)}$$

$$c_1' = c_1 + \sum_{i=0}^{\ell} evk[i][1] c_2^{(i)}$$

and output ($c_0'$, $c_1'$).

Simple Encrypted Arithmetic Library (SEAL)

In practice, some operations in SEAL are performed slightly differently, or in slightly more generality, than in the FV scheme. To clarify the generalization of FV operations, it is convenient to think of each ciphertext component as corresponding to a particular power of the secret key s. In particular, in a ciphertext ct=($c_0, c_1, \ldots, c_k$) of size k+1, the $c_0$ term is associated with $s^0$, the $c_1$ term with $s^1$, and so on, so that the $c_k$ term is associated with $s^k$.

A ciphertext ct=($c_0, \ldots, c_k$) is decrypted by computing $$\left[\left\lfloor \frac{t}{q} [ct(s)]_q \right\rceil\right]_t = \left[\left\lfloor \frac{t}{q} [c_0 + \ldots + c_k s^k]_q \right\rceil\right]_t$$

This generalization of decryption is handled automatically. The decryption function determines the size of the input ciphertext, and generates the appropriate powers of the secret key which are required to decrypt it. Note that because well-formed ciphertexts of arbitrary length are considered valid, the compactness property of homomorphic encryption is automatically lost. Generally, compactness states that the decryption circuit should not depend on ciphertexts, or on the function being evaluated.

With reference to multiplication and the Multiply function, the first step that outputs the intermediate ciphertext ($c_0, c_1, c_2$) defines a function implemented as Evaluator::multiply_norelin, and causes the ciphertext to grow in size. The second step defines a relinearization function, implemented as Evaluator::relinearize, which takes a ciphertext of size three (3) and an evaluation key, and produces a ciphertext of size two (2), encrypting the same underlying plaintext. Note that the ciphertext ($c_0, c_1, c_2$) can already be decrypted to give the product of the underlying plaintexts so that the relinearization step is not necessary for correctness of homomorphic multiplication.

It is possible to repeatedly use a generalized version of the first step of the Multiply function to produce even larger ciphertexts to further avoid relinearization. In particular, $ct_1 = (c_0, c_1, \ldots, c_j)$ and $ct_2 = (d_0, d_1, \ldots, d_k)$ are two ciphertexts of sizes j+1 and k+1, respectively. The ciphertext output of Multiply($ct_1, ct_2$), which is of size j+k+1, is denoted as $ct_{mult} = (C_0, C_1, \ldots, C_{j+k})$. The polynomials $C_m \in R_q$ are computed as:

$$C_m = \left[\left\lfloor \frac{t}{q} \left(\sum_{r+s=m} c_r d_s\right) \right\rceil\right]_q.$$

In SEAL, function Multiply (or a family of functions) is defined to mean this generalization of the first step of multiplication, implemented as Evaluator::multiply.

Relinearization

As described herein, relinearization pertains not only to the FV scheme, but also to the particular implementation of SEAL as described above. Some terminology included in the discussion, such as the use of "EncryptionParameters", the object "Evaluator", and "decomposition_bit_count", are all related to SEAL and may be exposed very differently, or not at all, in other implementations. With reference to relinearization, to obtain and maintain cryptographic properties (e.g., compactness and circuit privacy) of the homomorphic encrypted data 106, a relinearization operation can be performed by the encryption application 114 after every homomorphic multiplication operation. The result of multiplying two ciphertexts of sizes M and N results in a ciphertext of size M+N-1. Relinearization can then be initiated to reduce the size down from three (3) to two (2) after each multiplication operation, preventing the ciphertext size from leaking information about the evaluated arithmetic circuit.

However, the encryption application 114 does not perform relinearization by default after each homomorphic multiplication. A function Evaluator::multiply of the object Evaluator can return a ciphertext of size M+N-1 (given inputs of M and N), and subsequent relinearization can be performed using a function Evaluator::relinearize. Although relinearization after every multiplication operation is a good strategy, it may not always be optimal, and in some cases, additional performance may be obtained by deferring relinearization until after a later operation and instead, performing homomorphic operations on larger ciphertexts. In implementations, relinearization reduces a ciphertext of arbitrary size down to any size at least two (2) (by default to size two (2)).

Another reason for not relinearizing by default is that the performance of the function Evaluator::relinearize depends on the choice of the parameter decomposition_bit_count in EncryptionParameters. A reasonable choice for the decomposition bit count is between ⅓ and ½ of the significant bit count of the coefficient modulus, but since it affects both ciphertext noise growth and performance, the optimal choice is not specifically determinable without knowing the details of the particular computation. However, the choice of the decomposition bit count does not matter if there will be no relinearization in the computation, and since relinearization does not occur by default, the constructor of EncryptionParameters can set it automatically to zero (0) (signaling that no relinearization will be performed).

To be able to relinearize a ciphertext, the owner of the secret key must have generated enough evaluation keys that need to be subsequently given as input to the constructor of an object Evaluator. More precisely, if a ciphertext has a size equal to K, then K-2 evaluation keys will be needed to relinearize it down to any size less than K. To generate k-evaluation keys with the key generator, the owner of the secret key can call KeyGenerator::generate with the parameter k. If the key generator is instantiated with a decomposition bit count of zero (0) as above, then the generate function can only be called with parameter k=0 as the default value. If no evaluation keys have been generated, the Evaluator can be constructed by only passing it a set of encryption parameters. If the Evaluator is constructed in such a way, then it will not be possible to use the function Evaluator::relinearize. To then perform relinearization, the decomposition bit count is set to a non-zero value, an appropriate number of evaluation keys are generated with KeyGenerator::generate, and the generated EvaluationKeys instance is passed to the constructor of Evaluator.

Example methods 300 and 400 are described with reference to respective FIGS. 3 and 4 in accordance with one or more aspects of multiplication operations on homomorphic encrypted data. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 3:
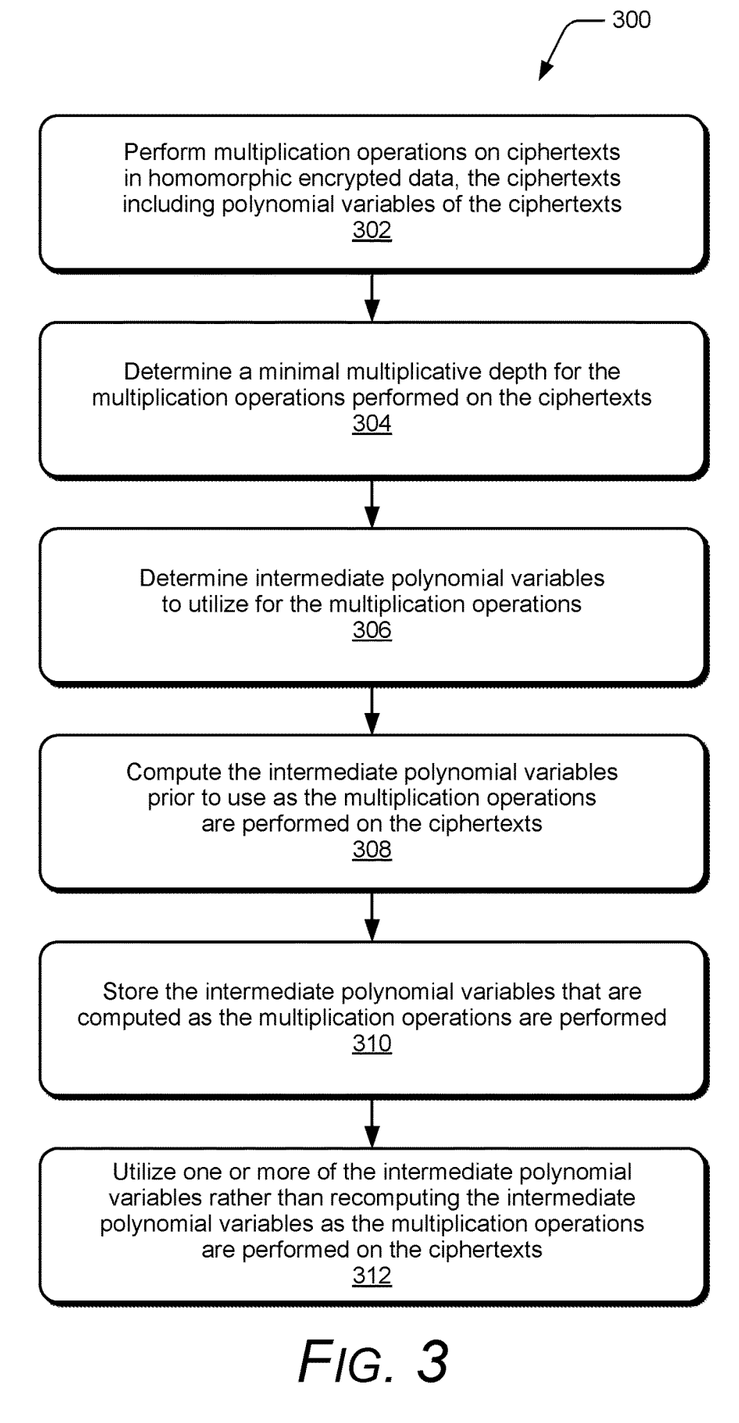
FIG. 3 illustrates an example method of multiplication operations on homomorphic encrypted data in accordance with techniques described herein.

FIG. 3 illustrates an example method 300 of multiplication operations on homomorphic encrypted data, and is generally described with reference to the encryption application implemented by a computing device and/or server device. The order in which the method is described is not intended to be construed as a limitation, and any number or combination of the method operations can be performed in any order to implement a method, or an alternate method.

At 302, multiplication operations are performed on ciphertexts in homomorphic encrypted data, the ciphertexts including polynomial variables of the ciphertexts. For example, the encryption application 114 that is implemented by the computing device 100 includes algorithms that perform the multiplication operations 112 on the ciphertexts 108, such as the ciphertext 116 that includes the polynomial variables 118. Similarly, the encryption application 114 that is implemented by the cloud-based service 202 performs the multiplication operations 112 on the polynomial variables of the ciphertexts 108 in the homomorphic encrypted data 106.

At 304, a minimal multiplicative depth is determined for the multiplication operations performed on the ciphertexts. For example, the circuit optimization algorithm 120 of the encryption application 114 that is implemented by the computing device 100 determines the minimal multiplicative depth 130 for the multiplication operations 112 performed on the ciphertexts 108. The circuit optimization algorithm 120 minimizes the number of consecutive multiplication operations performed on the polynomial variables 118 of the ciphertexts 108, and minimizes the number of the multiplication operations to instead perform addition and subtraction operations for faster computations on the polynomial variables of the ciphertexts. Similarly, the circuit optimization algorithm 120 of the encryption application 114 that is implemented by the cloud-based service 202 determines the minimal multiplicative depth 130 for the multiplication operations 112 performed on the ciphertexts 108.

At 306, intermediate polynomial variables are determined to utilize for the multiplication operations. For example, the circuit optimization algorithm 120 of the encryption application 114 that is implemented by the computing device 100 determines the intermediate polynomial variables 122 to utilize as the multiplication operations 112 are computed on the polynomial variables of the ciphertext 116. Similarly, the circuit optimization algorithm 120 of the encryption application 114 that is implemented by the cloud-based service 202 determines the intermediate polynomial variables 122 to utilize as the multiplication operations 112 are computed on the polynomial variables of the ciphertext 116.

At 308, the intermediate polynomial variables are computed prior to use as the multiplication operations are performed on the ciphertexts. For example, the circuit optimization algorithm 120 of the encryption application 114 that is implemented by the computing device 100 computes the intermediate polynomial variables 122 prior to use as the multiplication operations 112 are performed on the ciphertexts 108. In implementations, the circuit optimization algorithm 120 applies the Fourier transform 126 to determine one or more of the intermediate polynomial variables 122 of the ciphertext 116, multiplies two transformed polynomials coefficient-wise, and applies the inverse Fourier transform 128 to the multiplied transformed polynomials effective to transform back. Similarly, the circuit optimization algorithm 120 of the encryption application 114 that is implemented by the cloud-based service 202 computes the intermediate polynomial variables 122 prior to use as the multiplication operations 112 are performed on the ciphertexts 108.

At 310, the intermediate polynomial variables that are computed are stored as the multiplication operations are performed. For example, the encryption application 114 that is implemented by the computing device 100 stores the intermediate polynomial variables 122 in memory 104 for use as the multiplication operations 112 are performed on the polynomial variables 118. Similarly, the encryption application 114 that is implemented by the cloud-based service 202 stores the intermediate polynomial variables 122 for use as the multiplication operations 112 are performed on the polynomial variables 118.

At 312, one or more of the intermediate polynomial variables are utilized rather than recomputing the intermediate polynomial variables as the multiplication operations are performed on the ciphertexts. For example, the algorithms that are implemented by the encryption application 114 of the computing device 100 utilize the intermediate polynomial variables 122 for the multiplication operations 112, rather than recomputing the intermediate polynomial variables as the multiplication operations are performed on the ciphertexts 108. Similarly, the encryption application 114 that is implemented by the cloud-based service 202 utilizes the intermediate polynomial variables 122 for the multiplication operations 112, rather than recomputing the intermediate polynomial variables as the multiplication operations are performed on the ciphertexts 108.

Figure 4:
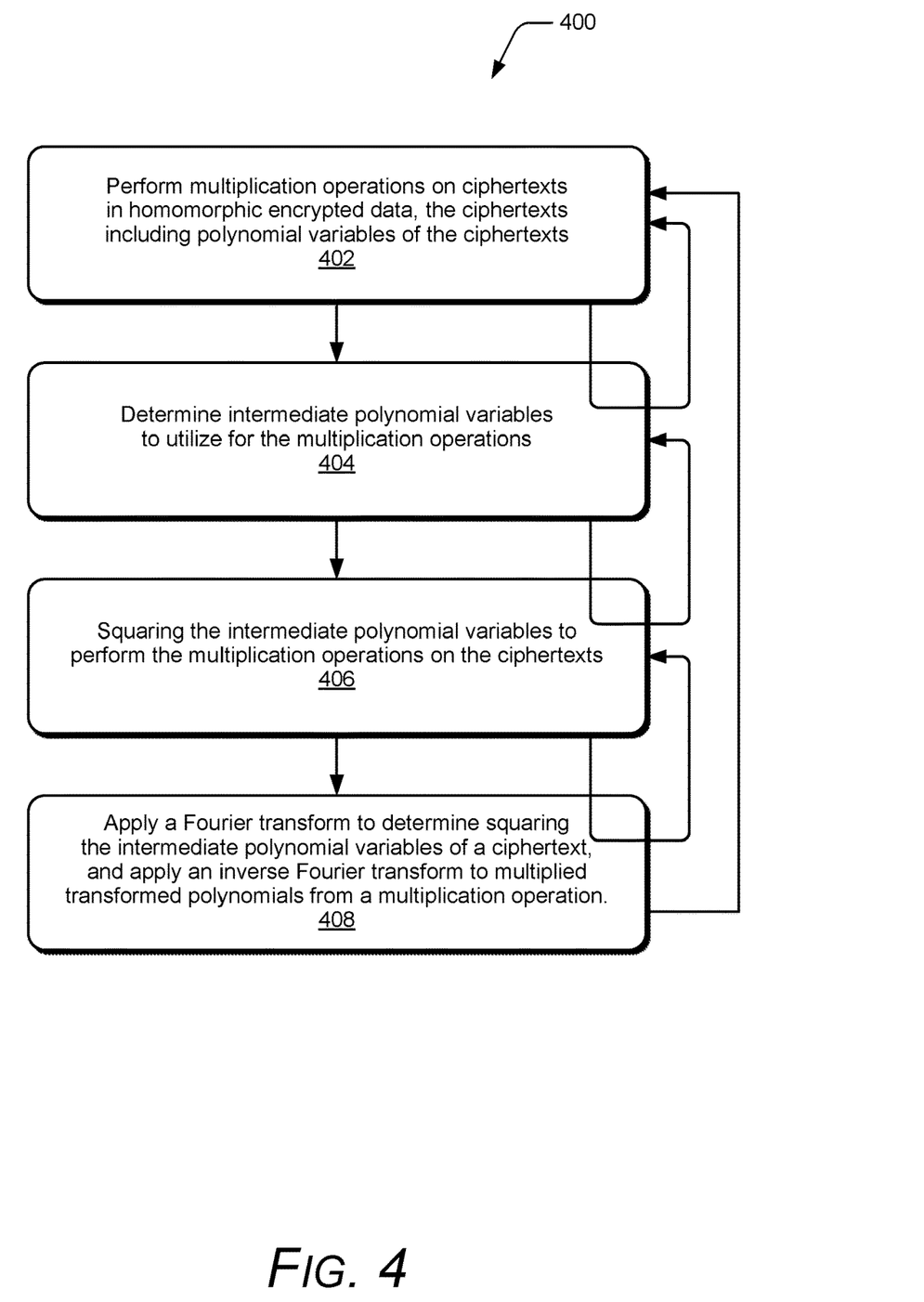
FIG. 4 illustrates an example method of multiplication operations on homomorphic encrypted data in accordance with techniques described herein.

FIG. 4 illustrates an example method 400 of multiplication operations on homomorphic encrypted data, and is generally described with reference to the encryption application implemented by a computing device and/or server device. The order in which the method is described is not intended to be construed as a limitation, and any number or combination of the method operations can be performed in any order to implement a method, or an alternate method.

At 402, multiplication operations are performed on ciphertexts in homomorphic encrypted data, the ciphertexts including polynomial variables of the ciphertexts. For example, the encryption application 114 that is implemented by the computing device 100 and/or by the cloud-based service 202 includes algorithms that perform the multiplication operations 112 on the ciphertexts 108, such as the ciphertext 116 that includes the polynomial variables 118.

At 404, intermediate polynomial variables are determined to utilize for the multiplication operations. For example, the circuit optimization algorithm 120 of the encryption application 114 that is implemented by the computing device 100 and/or by the cloud-based service 202 applies an optimization to recursively determine the intermediate polynomial variables 122, which are utilized for consecutive and subsequent multiplication operations 112 on the polynomial variables 118 of the ciphertexts 108 (at 402).

At 406, the intermediate polynomial variables are squared to perform the multiplication operations on the ciphertexts. For example, the circuit optimization algorithm 120 of the encryption application 114 that is implemented by the computing device 100 and/or by the cloud-based service 202 applies a squaring optimization to recursively square the intermediate polynomial variables 122 to determine the intermediate polynomial variables (at 404), which are utilized for the consecutive and subsequent multiplication operations 112 on the polynomial variables 118 of the ciphertexts 108 (at 402).

At 408, a Fourier transform is applied to determine squaring the intermediate polynomial variables of a ciphertext, and an inverse Fourier transform is applied to multiplied transformed polynomials from a multiplication operation performed on the ciphertext. For example, circuit optimization algorithm 120 of the encryption application 114 that is implemented by the computing device 100 and/or by the cloud-based service 202 applies a transform (fast-squaring) optimization that applies the Fourier transform 126 (e.g., an FFT or a DFT) to implement the squaring optimization of the intermediate polynomial variables 122 (at 406) to determine the intermediate polynomial variables (at 404), which are utilized for the consecutive and subsequent multiplication operations 112 on the polynomial variables 118 of the ciphertexts 108 (at 402).

The method then continues at 402 to perform a next multiplication operation on the ciphertexts, at 404 to determine the intermediate polynomial variables for the multiplication operations, at 406 to square the intermediate polynomial variables to implement determining the intermediate polynomial variables, and at 408 to apply transform optimizations to implement determining the intermediate polynomial variables and performing the multiplication operations on the ciphertexts.

Figure 5:
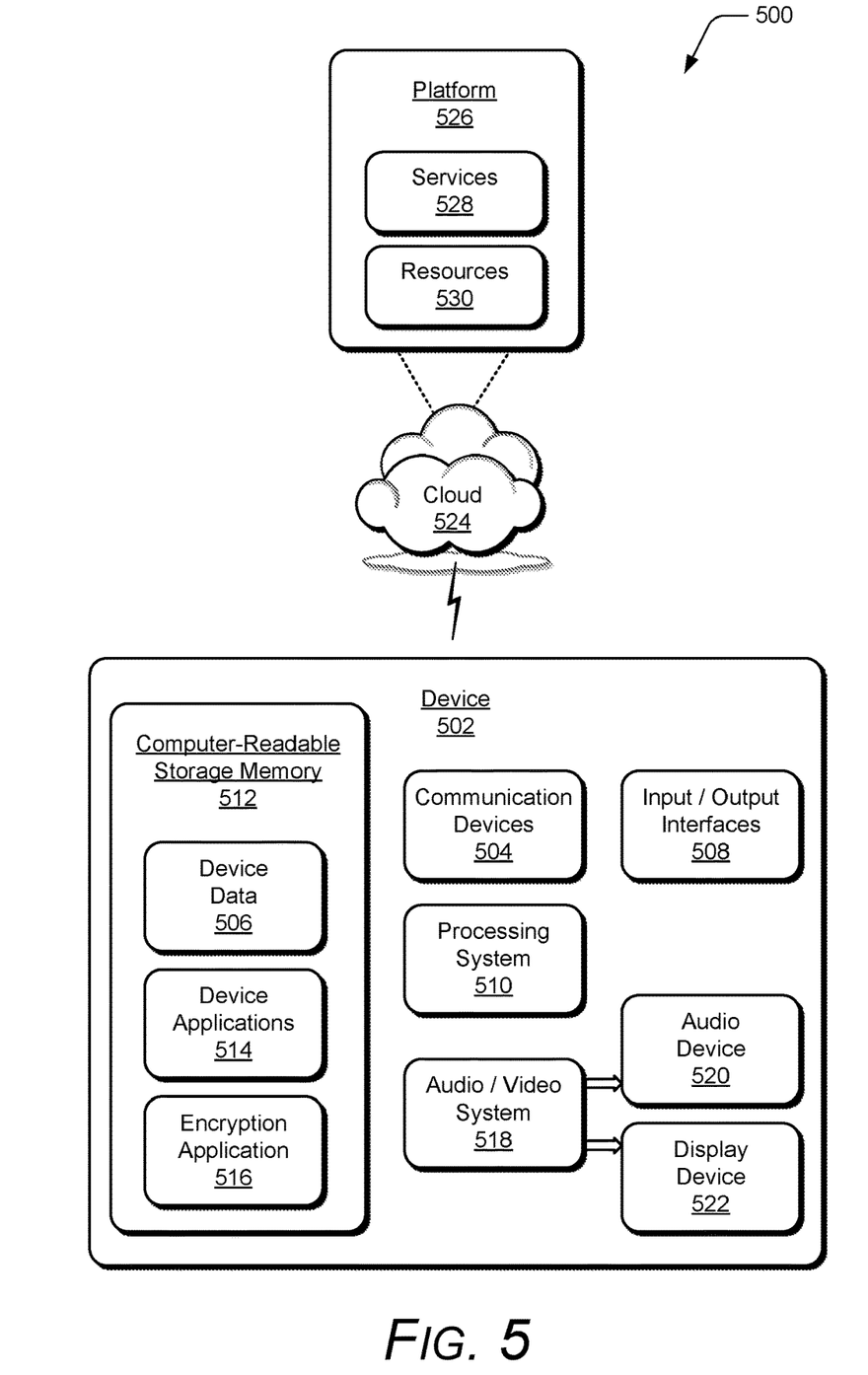
FIG. 5 illustrates an example system with an example device that can implement multiplication operations on homomorphic encrypted data as described herein.

FIG. 5 illustrates an example system 500 that includes an example device 502, which can implement aspects of multiplication operations on homomorphic encrypted data. The example device 502 can be implemented as any of the computing devices, user devices, and server devices described with reference to the previous FIGS. 1-4, such as any type of mobile device, wearable device, client device, mobile phone, tablet, computing, communication, entertainment, gaming, media playback, and/or other type of device. For example, the computing device and server device described herein may be implemented as the example device 502 or with various components of the example device.

The device 502 includes communication devices 504 that enable wired and/or wireless communication of device data 506, such as homomorphic encrypted data, dataset bits of the homomorphic encrypted data, ciphertexts, and any other type of data related to homomorphic encrypted data and queries. Additionally, the device data can include any type of audio, video, and/or image data. The communication devices 504 can also include transceivers for cellular phone communication and for network data communication.

The device 502 also includes input/output (I/O) interfaces 508, such as data network interfaces that provide connection and/or communication links between the device, data networks, and other devices described herein. The I/O interfaces can be used to couple the device to any type of components, peripherals, and/or accessory devices. The I/O interfaces also include data input ports via which any type of data, media content, and/or inputs can be received, such as user inputs to the device, as well as any type of audio, video, and/or image data received from any content and/or data source.

The device 502 includes a processing system 510 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 502 may further include any type of a system bus or other data and command transfer system that couples the various components within the device. A system bus can include any one or combination of different bus structures and architectures, as well as control and data lines.

The device 502 also includes a computer-readable storage memory 512, such as data storage devices that can be accessed by a computing device, and that provide persistent storage of data and executable instructions (e.g., software applications, programs, functions, and the like). Examples of the computer-readable storage memory 512 include volatile memory and non-volatile memory, fixed and removable media devices, and any suitable memory device or electronic data storage that maintains data for computing device access. The computer-readable storage memory can include various implementations of random access memory (RAM) (e.g., the DRAM and battery-backed RAM), read-only memory (ROM), flash memory, and other types of storage media in various memory device configurations.

The computer-readable storage memory 512 provides storage of the device data 506 and various device applications 514, such as an operating system that is maintained as a software application with the computer-readable storage memory and executed by the processing system 510. In this example, the device applications include an encryption application 516 that implements the features and techniques of multiplication operations on homomorphic encrypted data, such as when the example device 502 is implemented as the computing device 100 and/or as a server device of the cloud-based service 202 described herein with reference to FIGS. 1-4. Examples of the encryption application 516 include the encryption application 114 implemented by the computing device 100 as described with reference to FIG. 1, and the encryption application 114 implemented by a server device of the cloud-based service 202 as described with reference to FIG. 2.

The device 502 also includes an audio and/or video system 518 that generates audio data for an audio device 520 and/or generates display data for a display device 522. The audio device and/or the display device include any devices that process, display, and/or otherwise render audio, video, display, and/or image data. In implementations, the audio device and/or the display device are integrated components of the example device 502. Alternatively, the audio device and/or the display device are external, peripheral components to the example device.

In aspects of multiplication operations on homomorphic encrypted data, at least part of the techniques described herein may be implemented in a distributed system, such as over a "cloud" 524 in a platform 526. The cloud 524 includes and/or is representative of the platform 526 for services 528 and/or resources 530. The platform 526 abstracts underlying functionality of hardware, such as server devices (e.g., included in the services 528) and/or software resources (e.g., included as the resources 530), and connects the example device 502 with other devices, servers, etc. The resources 530 may also include applications and/or data that can be utilized while computer processing is executed on servers that are remote from the example device 502. Additionally, the services 528 and/or the resources 530 may facilitate subscriber network services, such as over the Internet, a cellular network, or Wi-Fi network. The platform 526 may also serve to abstract and scale resources to service a demand for the resources 530 that are implemented via the platform, such as in an interconnected device embodiment with functionality distributed throughout the system 500. For example, the functionality may be implemented in part at the example device 502 as well as via the platform 526 that abstracts the functionality of the cloud.

Although aspects of multiplication operations on homomorphic encrypted data have been described in language specific to features and/or methods, the appended claims are not necessarily limited to the specific features or methods described. Rather, the specific features and methods are disclosed as example implementations of multiplication operations on homomorphic encrypted data, and other equivalent features and methods are intended to be within the scope of the appended claims. Further, various different embodiments are described and it is to be appreciated that each described embodiment can be implemented independently or in connection with one or more other described embodiments. Additional aspects of the techniques, features, and/or methods discussed herein relate to one or more of the following:

A computing device implemented for multiplication operations on homomorphic encrypted data, the computing device comprising: a memory configured to store the homomorphic encrypted data as a dataset; a processor system configured to execute an encryption application that is implemented to: perform multiplication operations on ciphertexts in the homomorphic encrypted data, the ciphertexts including polynomial variables of the ciphertexts; store, in the memory, intermediate polynomial variables that are computed as the multiplication operations are performed; and utilize one or more of the intermediate polynomial variables rather than recomputing the intermediate polynomial variables as the multiplication operations are performed on the ciphertexts.

Alternatively or in addition to the above described computing device, any one or combination of: the encryption application is implemented to determine a minimal multiplicative depth for the multiplication operations performed on the ciphertexts. The encryption application is implemented to minimize a number of consecutive ones of the multiplication operations performed on the polynomial variables of the ciphertexts. The encryption application is implemented to determine the one or more intermediate polynomial variables to utilize for the multiplication operations. The encryption application is implemented to initially compute the one or more intermediate polynomial variables prior to use as the multiplication operations are performed on the ciphertexts. The encryption application is implemented to minimize a number of the multiplication operations to instead perform addition and subtraction operations for faster computations on the polynomial variables of the ciphertexts. The encryption application is implemented to: apply a Fourier transform to determine the one or more intermediate polynomial variables of a ciphertext; multiply two transformed polynomials coefficient-wise; and apply an inverse Fourier transform to the multiplied transformed polynomials effective to transform back.

A method for multiplication operations on homomorphic encrypted data, the method comprising: performing multiplication operations on ciphertexts in the homomorphic encrypted data, the ciphertexts including polynomial variables of the ciphertexts; storing intermediate polynomial variables that are computed as the multiplication operations are performed; and utilizing one or more of the intermediate polynomial variables rather than recomputing the intermediate polynomial variables as the multiplication operations are performed on the ciphertexts.

Alternatively or in addition to the above described method, any one or combination of: determining a minimal multiplicative depth for the multiplication operations performed on the ciphertexts. The method further comprising minimizing a number of consecutive ones of the multiplication operations performed on the polynomial variables of the ciphertexts. The method further comprising determining the one or more intermediate polynomial variables to utilize for the multiplication operations. The method further comprising initially-computing the one or more intermediate polynomial variables prior to use as the multiplication operations are performed on the ciphertexts. The method further comprising minimizing a number of the multiplication operations to instead perform addition and subtraction operations for faster computations on the polynomial variables of the ciphertexts. The method further comprising applying a Fourier transform to determine the one or more intermediate polynomial variables of a ciphertext; multiplying two transformed polynomials coefficient-wise; and applying an inverse Fourier transform to the multiplied transformed polynomials effective to transform back.

A method for multiplication operations on homomorphic encrypted data, the method comprising: performing multiplication operations on ciphertexts in the homomorphic encrypted data, the ciphertexts including polynomial variables of the ciphertexts; utilizing one or more of the intermediate polynomial variables rather than recomputing the intermediate polynomial variables as the multiplication operations are performed on the ciphertexts; and maintaining a minimal multiplicative depth for the multiplication operations performed on the ciphertexts.

Alternatively or in addition to the above described method, any one or combination of: minimizing a number of consecutive ones of the multiplication operations performed on the polynomial variables of the ciphertexts. The method further comprising determining the one or more intermediate polynomial variables to utilize for the multiplication operations. The method further comprising initially-computing the one or more intermediate polynomial variables prior to use as the multiplication operations are performed on the ciphertexts. The method further comprising minimizing a number of the multiplication operations to instead perform addition and subtraction operations for faster computations on the polynomial variables of the ciphertexts. The method further comprising applying a Fourier transform to determine the one or more intermediate polynomial variables of a ciphertext; multiplying two transformed polynomials coefficient-wise; and applying an inverse Fourier transform to the multiplied transformed polynomials effective to transform back.

The invention claimed is:

1. A computing device implemented for multiplication operations on homomorphic encrypted data, the computing device comprising:
   a memory configured to store the homomorphic encrypted data as a dataset;
   a processor system configured to execute an encryption application that is implemented to:
      perform a plurality of different multiplication operations on ciphertexts in the homomorphic encrypted data, the ciphertexts including polynomial variables of the ciphertexts;
      store, in the memory, an intermediate polynomial variable that is computed as a first multiplication operation is performed;
      utilize the intermediate polynomial variable for a subsequent, different multiplication operation on the ciphertexts, rather than recomputing the intermediate polynomial variables; and
      minimize a number of consecutive multiplication operations performed on the polynomial variables of the ciphertexts.

2. The computing device as recited in claim 1, wherein the encryption application is implemented to determine a minimal multiplicative depth for the plurality of different multiplication operations performed on the ciphertexts.

3. The computing device as recited in claim 1, wherein the encryption application is implemented to determine one or more intermediate polynomial variables to utilize for the plurality of different multiplication operations.

4. The computing device as recited in claim 3, wherein the encryption application is implemented to initially compute the one or more intermediate polynomial variables prior to use as the plurality of different multiplication operations are performed on the ciphertexts.

5. The computing device as recited in claim 1, wherein the encryption application is implemented to minimize a number of the multiplication operations to instead perform addition and subtraction operations for faster computations on the polynomial variables of the ciphertexts.

6. The computing device as recited in claim 3, wherein the encryption application is implemented to:
   apply a Fourier transform to determine the one or more intermediate polynomial variables of a ciphertext;
   multiply two transformed polynomials coefficient-wise; and
   apply an inverse Fourier transform to the multiplied transformed polynomials effective to transform back.

7. A method for multiplication operations on homomorphic encrypted data, the method comprising:
   performing a plurality of different multiplication operations on ciphertexts in the homomorphic encrypted data, the ciphertexts including polynomial variables of the ciphertexts;
   storing an intermediate polynomial variable that is computed as a first multiplication operation is performed;
   utilizing the intermediate polynomial variable for a subsequent, different multiplication operation on the ciphertexts, rather than recomputing the intermediate polynomial variables; and
   minimizing a number of consecutive multiplication operations performed on the polynomial variables of the ciphertexts.

8. The method as recited in claim 7, further comprising:
determining a minimal multiplicative depth for the plurality of different multiplication operations performed on the ciphertexts.

9. The method as recited in claim 7, further comprising:
determining one or more intermediate polynomial variables to utilize for the plurality of different multiplication operations.

10. The method as recited in claim 9, further comprising:
initially-computing the one or more intermediate polynomial variables prior to use as the plurality of different multiplication operations are performed on the ciphertexts.

11. The method as recited in claim 7, further comprising:
minimizing a number of the multiplication operations to instead perform addition and subtraction operations for faster computations on the polynomial variables of the ciphertexts.

12. The method as recited in claim 9, further comprising:
applying a Fourier transform to determine the one or more intermediate polynomial variables of a ciphertext;
multiplying two transformed polynomials coefficient-wise; and
applying an inverse Fourier transform to the multiplied transformed polynomials effective to transform back.

13. A method for multiplication operations on homomorphic encrypted data, the method comprising:
   performing a plurality of different multiplication operations on ciphertexts in the homomorphic encrypted data, the ciphertexts including polynomial variables of the ciphertexts;
   utilizing one or more intermediate polynomial variables that were computed and stored as a first multiplication operation was performed, rather than recomputing the intermediate polynomial variables as subsequent, different multiplication operations are performed on the ciphertexts;
   maintaining a minimal multiplicative depth for the multiplication operations performed on the ciphertexts; and
   minimizing a number of consecutive multiplication operations performed on the polynomial variables of the ciphertexts.

14. The method as recited in claim 13, further comprising:
determining the one or more intermediate polynomial variables to utilize for the multiplication operations.

15. The method as recited in claim 14, further comprising:
initially-computing the one or more intermediate polynomial variables prior to use as the plurality of different multiplication operations are performed on the ciphertexts.

16. The method as recited in claim 13, further comprising:
minimizing a number of the multiplication operations to instead perform addition and subtraction operations for faster computations on the polynomial variables of the ciphertexts.

17. The method as recited in claim 13, further comprising:
applying a Fourier transform to determine the one or more intermediate polynomial variables of a ciphertext;
multiplying two transformed polynomials coefficient-wise; and
applying an inverse Fourier transform to the multiplied transformed polynomials effective to transform back.

\* \* \* \* \*